United States Patent
May

(12) 
(10) Patent No.: US 6,460,771 B1
(45) Date of Patent: Oct. 8, 2002

(54) MOTORIZED CARD READER MODULE

(75) Inventor: David C. C. May, Fife (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/589,694

(22) Filed: Jun. 8, 2000

(30) Foreign Application Priority Data

Jun. 29, 1999 (GB) .............................................. 9915193

(51) Int. Cl.$^7$ ............................................. G06K 13/00
(52) U.S. Cl. ...................................... 235/476; 235/441
(58) Field of Search ................................. 235/476, 441

(56) References Cited

U.S. PATENT DOCUMENTS

| | | | |
|---|---|---|---|
| 3,735,098 A | * 5/1973 | Hirata | 235/476 |
| 3,821,622 A | * 6/1974 | Mateja | 235/476 |
| 3,937,928 A | * 2/1976 | Sasaki et al. | 235/476 |
| 3,951,251 A | * 4/1976 | Zaccagnino | 235/476 |
| 4,007,356 A | 2/1977 | Stucke et al. | |
| 4,259,569 A | * 3/1981 | Passer et al. | 235/476 |

FOREIGN PATENT DOCUMENTS

FR    2720851    12/1995

OTHER PUBLICATIONS

Svigals J: "Unauthorized Card Stripe Reading Inhibitor", IBM TECHNICAL DISCLOSURE BULLETIN, vol. 26, No. 6, Nov. 1, 1983 (1983-11-01), page 2707 XP002145300, New York.

* cited by examiner

Primary Examiner—Harold I. Pitts
(74) Attorney, Agent, or Firm—Francis L. Conte

(57) ABSTRACT

A motorized card reader module (14d) is described. The module (14d) has a transport system (22,26) that is operable to transport a card (30) into the card reader module (14d) in a stop/start manner until the card (30) is fully enclosed by the card reader module (14d), and thereafter to transport the card (30) in a continuous manner so that a magnetic stripe on the card (30) can be accurately read by a reading head (24) in the module (14d), but not by a third party reading head located outside the module (14d). A method of preventing fraud at an SST, and an SST having a motorized card reader module are also described.

22 Claims, 2 Drawing Sheets

MOTORIZED CARD READER MODULE

BACKGROUND OF THE INVENTION

The present invention relates to a motorized card reader module. The module may be for use in a self-service terminal (SST), such as an automated teller machine (ATM). The invention also relates to a method of preventing fraud at an SST.

One type of fraud that occurs at an ATM is for a third party to place a small module in front of the ATM's motorized card reader. The module is professionally designed so that it conforms to the appearance of the ATM and is not obvious to a user. The module generally has a magnetic head for reading the magnetic stripe commonly used on banking cards. The module also has electronics associated with the magnetic head for reading the data stored on the magnetic stripe, and has either a memory for storing the read data or transmission apparatus for transmitting the read data to the third party.

As the module is small, it does not impede insertion or removal of the user's card. When the user enters his card, the motorized card reader pulls the card in smoothly so that the genuine magnetic card reader can read the card. However, as the card is being pulled through the fraudulent module by the motorized card reader, the card reader in the fraudulent module reads the data on the magnetic stripe.

The user is unaware that his card has been read by the fraudulent module because the module is small and unobtrusive and because the module does not impede insertion or removal of the card. Once the card data is known, the third party can re-construct the user's card.

A variety of techniques may be used to obtain a user's PIN. For example, a false keypad overlay may be located above the actual keypad, such that when a user enters his PIN, the sequence of digits is recorded by the false keypad. Alternatively, a user may simply be observed while using the ATM and his PIN noted. If the third party can obtain the user's PIN, then the third party has both the card details and the PIN, thereby enabling the third party to generate a counterfeit card and to make withdrawals from the user's bank account without the user's knowledge.

SUMMARY OF THE INVENTION

According to a first aspect of the invention there is provided a motorized card reader module having a transport system characterized in that the transport system is operable to halt transport of a card on at least one occasion while the card is not fully enclosed by the card reader module.

Preferably, the transport system transports the card for a first time period during which the transport system is energized, and for a second time period during which the transport system is halted, and the system uses the first and second time periods alternately until the card is fully enclosed by the card reader. This has the effect of successively stopping and starting the card movement until the card is wholly within the card reader module.

It will be appreciated that once the card is wholly within the card reader module, the transport system transports the card in a continuous movement.

The transport system may transport the card for a third time period during which the card movement is in a reverse direction. The third time period may be used less frequently than the first and second time periods, alternatively or additionally, the third time period may be shorter than each of the first and second time periods.

Preferably, the first, second, and third time periods are very short, for example, less than 0.2 seconds each, to ensure that the non-uniform speed is not evident to a user.

Preferably, the first, second, and third time periods are controlled by a card reader controller that is used to control the transport system of the card reader.

The first, second, and third time periods may be generated randomly or pseudorandomly.

On ejecting a card, the transport system may be operable to transport the card in a continuous movement when the card is inside and when the card is only partially inside the card reader module. Alternatively, on ejecting a card, the card reader may eject the card in a continuous movement until the card protrudes through the card reader module and thereafter halt the card on at least two occasions. In conventional motorized card readers, the card is halted on one occasion; that is, for presentation to the cardholder.

By virtue of this aspect of the invention any third party module located near to the entrance of the motorized card reader will not be able to read an inserted card accurately because the card has been stopped during transport. However, once the card is fully enclosed by the genuine card reader module, the card can be read because it is then being transported continuously.

According to a second aspect of the invention there is provided a motorized card reader module having a transport system characterized in that the transport system is operable to move a card in a stop/start manner until the card is fully enclosed by the card reader module.

The transport system may stop the movement of the card on only one occasion. Alternatively, and more preferably, the transport system may stop the movement of the card on multiple occasions, such as three or more occasions.

According to a third aspect of the invention there is provided a motorized card reader module having a transport system characterized in that the transport system is operable to move a card intermittently until the card is fully enclosed by the card reader module.

According to a fourth aspect of the invention there is provided a self-service terminal having a motorized card reader module, characterized in that the card reader module is operable to transport a card intermittently when the card is partially protruding from the card reader module, and to transport the card continuously when the card is fully enclosed by the card reader module.

According to a fifth aspect of the invention there is provided a method of preventing fraud at a self-service terminal, the method being characterized by the steps of: receiving a card from a user, transporting the card into a card reader module in an intermittent movement while the card protrudes from the card reader module, and transporting the card in a continuous movement once the card is fully enclosed by the card reader module.

Once the card has been read by the card reader module, it is retained within the module until the transaction is completed, as in conventional SSTs.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
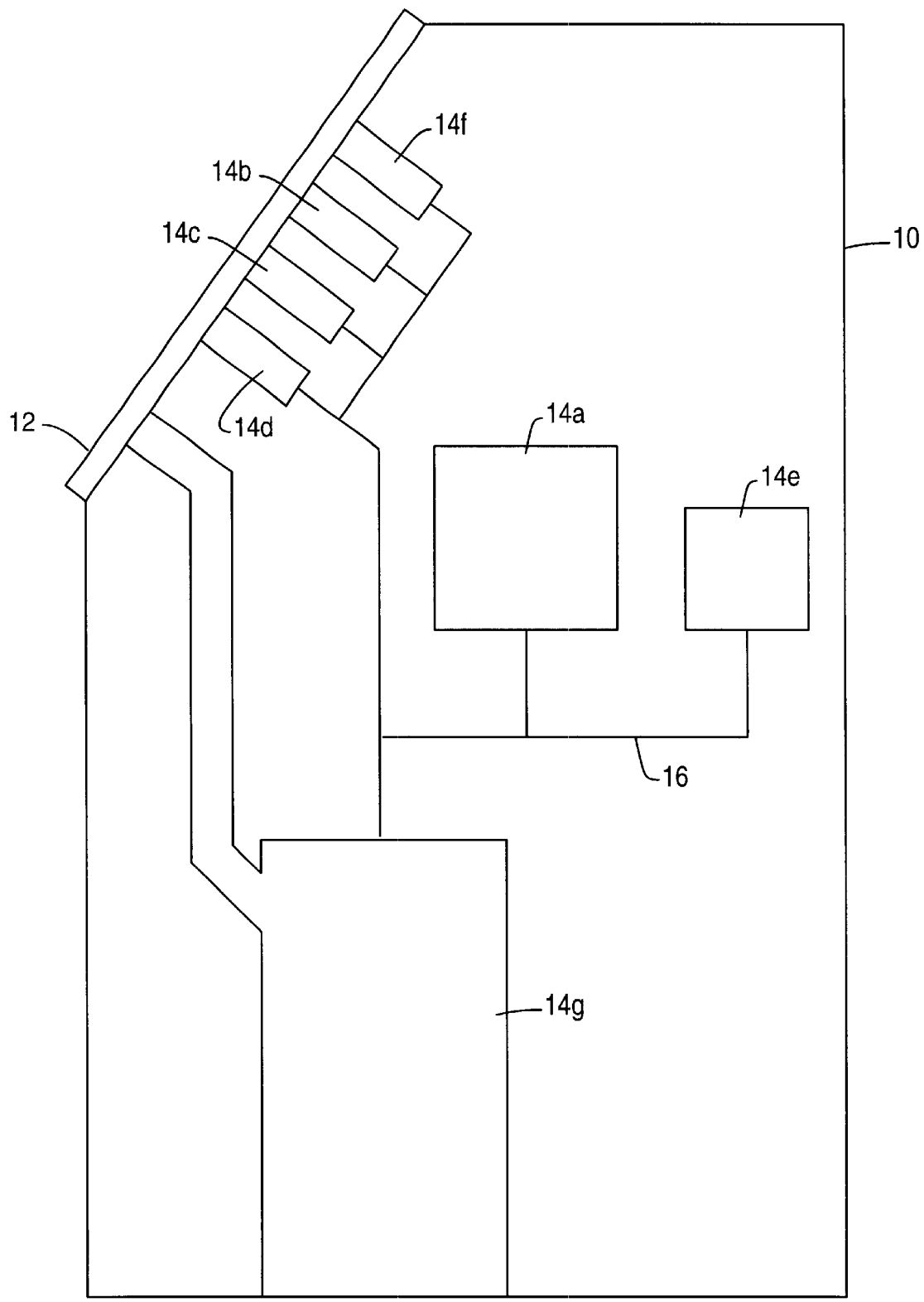
FIG. 1 is a block diagram of an SST incorporating a motorized card reader module in accordance with one embodiment of the invention.

Referring to FIG. 1, there is shown a public access SST 10 in the form of an ATM in accordance with an embodiment of the present invention. The ATM 10 has a user interface 12 and seven modules 14 interconnected by a proprietary network 16.

The modules 14 comprise a terminal controller 14a, a display 14b, an encrypting keypad 14c, a card reader 14d (such as a Sankyo motorized card reader module), a journal printer 14e, a receipt printer 14f, and a cash dispenser 14g. The modules 14 operate in a master/slave relationship, where the controller 14a is the master that controls the operation of the other modules 14b to 14g. However, each of the other modules 14b to 14g has a processor for operating on received data and for performing the specific functions of that module 14.

Journal printer 14e is internal to the ATM 10 and is used by the owner of the ATM 10 for reconciling transaction data, and by ATM service personnel in the event of a malfunction.

Figure 2:
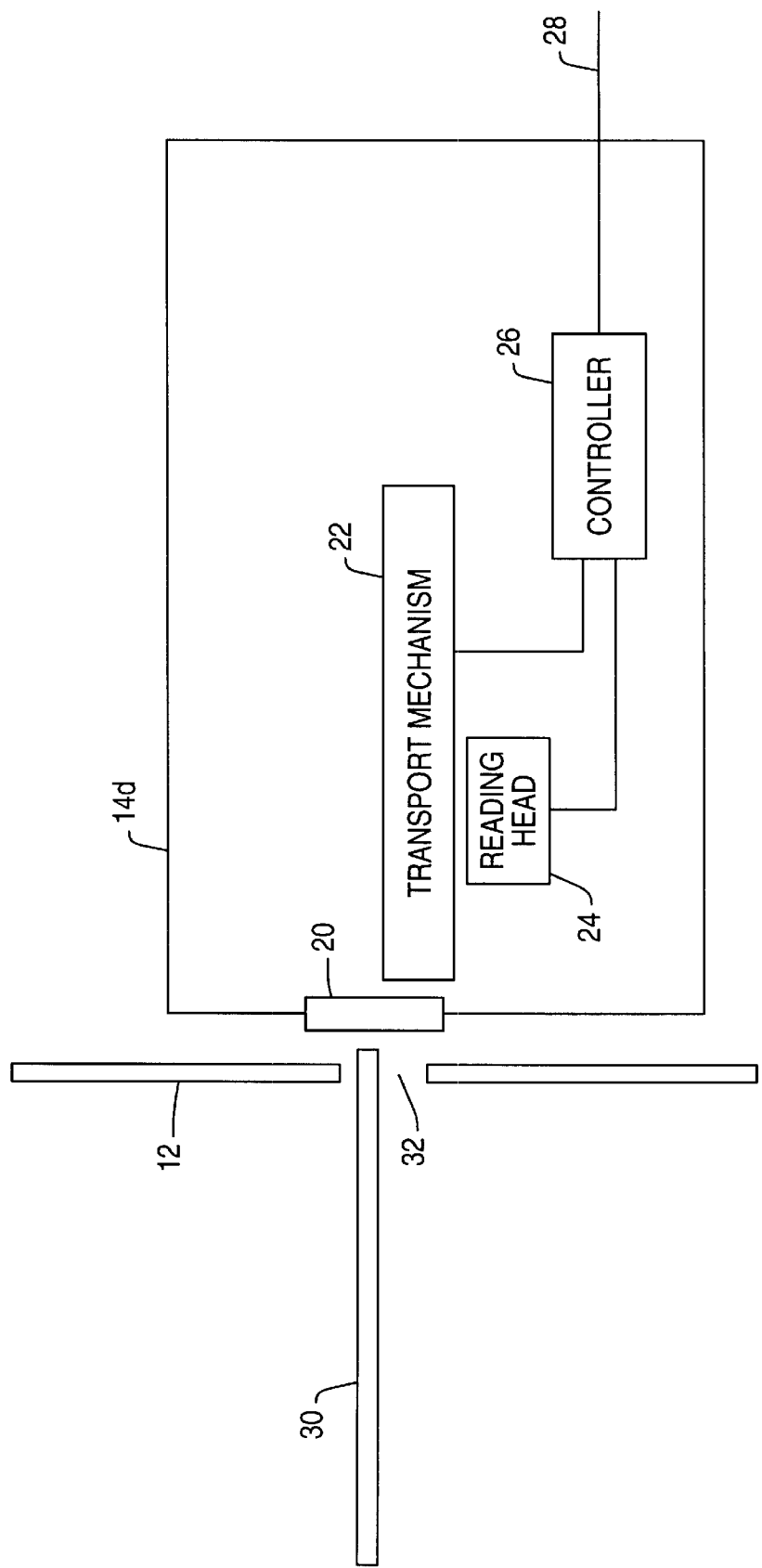
FIG. 2 is a simplified block diagram of the motorized card reader module of FIG. 1.

Referring to FIG. 2, there is shown a simplified block diagram of the card reader module 14d aligned with the user interface 12. Module 14d has an entry/exit slot 20 for receiving a card into and for ejecting a card from the module 14d. Slot 20 includes a pair of rollers (not shown) to guide an inserted card onto a transport mechanism 22. Transport mechanism 22 conveys a card between the entry/exit slot 20 and a magnetic card reading head 24. The card reading head 24 and the transport mechanism are both controlled by a controller 26. The controller 26 and transport mechanism 22 form a transport system.

The controller 26 is implemented in hardware and software, and is responsible for activating the transport mechanism, interfacing with the terminal controller 14a (FIG. 1), and sending information received from the reading head 24 to the terminal controller 14a via output 28. Controller 26 may also implement encryption to provide security for the information sent to the terminal controller 14a.

Referring to both FIGS. 1 and 2, in use, a user inserts his banking card 30 into a card reader slot 32 in the user interface 12. The card reader slot 32 is aligned with entry/exit slot 20, so that on inserting his card 30, the card 30 is pinched by the rollers (not shown) in the card reader module 14d and guided to the transport mechanism 22. The controller 26 activates the transport mechanism 22 for a first time period, which typically lasts for 0.2 seconds, the controller 26 then de-activates the transport mechanism for a second time period, which typically lasts 0.1 seconds. The controller 26 continually activates and deactivates mechanism 22 until the card 30 is fully enclosed by the module 14d; this ensures that the card 30 is transported in a start/stop manner. Thereafter, the controller 26 activates the mechanism 22 to ensure that the card 30 is transported continuously. This enables card reading head 24 to read the magnetic stripe (not shown) on the card 30 accurately. Conventional card reader modules 14d have a plurality of different sensors for detecting when the card 30 is fully enclosed by the card reader module 14d. For example, a sensor (not shown) is used to close a shutter once the card 30 is fully enclosed. This shutter is opened prior to ejecting the card 30. This sensor (not shown) could be used by the controller 26 to change the transport system from start/stop mode to continuous mode.

Once a transaction (for example, withdrawal of cash) is complete and the card 30 is to be returned prior to dispensing the cash, the controller 26 activates the transport mechanism 22 so that the card 30 is ejected from the module 14d until it protrudes through the slot 32 in user interface 12. Once a part of the card 30 protrudes through the entry/exit slot 20, the controller 26 alternately activates and de-activates the transport mechanism 22 to ensure that any third party card reader located near the slot 32 in the user interface 12 is not able to read the ejected card 30, thereby preventing fraud.

It will be appreciated that by transporting the card 30 intermittently (in a start/stop manner) while the card is protruding from the module 14d, and continuously while the card is fully enclosed by the module 14d, a magnetic stripe on the card 30 can be accurately read by the reading head 24 in the module 14d, but not by a third party reading head located outside the module 14d. This is because a card reading head cannot read a magnetic stripe on a card unless the card is moving continuously to provide the reading head with a reference. This embodiment reduces the possibility of fraud.

It should be appreciated that when a card is being transported continuously the speed of transport may vary during the continuous transport, but the speed of transport does not drop to zero. When a card is transported intermittently, the speed of transport drops to zero on at least one occasion.

Various modifications may be made to the above described embodiment within the scope of the invention. For example, a magnetic card other than a banking card may be used, such as a loyalty card. In other embodiments, more or less than two time periods may be used. In other embodiments, the control of the time periods may be performed by hardware, firmware, software, or a combination of these.

What is claimed is:

1. A motorized card reader module comprising:
   a transport system operable to (i) halt transport of a card on at least one occasion while the card is not fully enclosed by the card reader module, and (ii) generate in a random or pseudo-random manner a time period during which transport of the card is halted.

2. A card reader module according to claim 1, wherein (i) the transport system is activated for a first time period during which the card is transported, and (ii) the transport system is deactivated for a second time period during which transport of the card is halted.

3. A card reader module according to claim 2, wherein the transport system alternately activates and deactivates for the first and second time periods, respectively, until the card is fully enclosed by the card reader module.

4. A card reader module according to claim 3, wherein the transport system is activated for a third time period during which the card is transported in a reverse direction.

5. A card reader module according to claim 4, wherein the third time period is used less frequently than the first and second time periods.

6. A card reader module according to claim 5, further comprising a card reader controller for controlling the transport system and the first, second, and third time periods associated with the transport system.

7. A card reader module according to claim 4, wherein the first, second, and third time periods are generated randomly.

8. A card reader module according to claim 1, wherein the transport system is operable to eject the card in a continuous movement until the card protrudes through the card reader module and thereafter to halt the card on at least two occasions.

9. A motorized card reader module comprising:

a housing defining a chamber; and a transparent mechanism for (i) moving a card in a forward direction into the chamber, (ii) halting movement of the card in the forward direction on at least one occasion before the entire card has moved into the chamber, and (iii) generating in a random or pseudo-random manner a time period during which transport of the card is halted.

10. A card reader module according to claim 9, wherein (i) the transport system is activated for a first time period during which the card is moved in the forward direction, and (ii) the transport system is deactivated for a second time period during which movement of the card in the forward direction is halted.

11. A card reader module according to claim 10, wherein the transport system alternately activates and deactivates for the first and second time periods, respectively, until the entire card has moved into the chamber.

12. A card reader module according to claim 11, wherein the transport system is activated for a third time period during which the card is moved in a reverse direction.

13. A card reader module according to claim 12, wherein the third time period is used less frequently than the first and second time periods.

14. A card reader module according to claim 13, further comprising a card reader controller for controlling the transport system and the first, second, and third time periods associated with the transport system.

15. A card reader module according to claim 12, wherein the first, second, and third time periods are generated randomly.

16. A self-service terminal comprising:

a motorized card reader module operable to transport a card intermittently when the card is partially protruding from the card reader module by generating in a random or pseudo-random manner a time period during which transport of the card is halted, and to transport the card continuously when the card is fully enclosed by the card reader module.

17. A method of preventing fraud at a self-service terminal, the method comprising:

receiving a card from a user;

transporting the card into a card reader module in an intermittent movement while the card protrudes from the card reader module by generating in a random or pseudo-random manner a time period during which transport of the card is halted; and transporting the card in a continuous movement once the card is enclosed by the card reader module.

18. A method of operating a self-service terminal to prevent fraud, the method comprising:

receiving a card from a user;

moving the card in a forward direction into a chamber of a card reader module; and halting movement of the card in the forward direction on at least one occasion before the entire card has moved into the chamber to prevent a read head located outside of the chamber from accurately reading the card during movement of the card in the forward direction into the chamber and thereby to prevent fraud; and generating in a random or pseudo-random manner a time period during which movement of the card is halted.

19. A self-service terminal comprising:

a user interface panel including a first slot for receiving a data bearing magnetic stripe card;

a motorized card reader module disposed behind said interface panel, and including a second slot aligned with said first slot;

a transport mechanism disposed in said module under control of a controller configured for transporting said card over a magnetic card reading head mounted inside said module for reading said data on said card; and said controller being further configured for (i) halting transport of said card at least once while said card is being transported partially forward through said first slot and then resuming continuous forward transport thereof over said reading head for reading said card inside said module, and (ii) generating in a random or pseudo-random manner a time period during which transport of the card is halted.

20. A terminal according to claim 19 wherein said controller is further configured for reversing transport of said card after reading thereof, and ejecting said card through said first slot while temporarily halting ejection of said card during partial ejection thereof.

21. A terminal according to claim 20 wherein said controller is further configured for intermittently halting said card during both insertion into and ejection from said module.

22. A terminal according to claim 21 wherein said controller is further configured for intermittently halting said card transport for a fraction of a second so that non-uniform transport thereof is not evident to a user.

* * * * *